United States Patent
Terao et al.

(10) Patent No.: US 9,336,769 B2
(45) Date of Patent: May 10, 2016

(54) RELATIVE SEMANTIC CONFIDENCE MEASURE FOR ERROR DETECTION IN ASR

(75) Inventors: Makoto Terao, Tokyo (JP); Mari Ostendorf, Seattle, WA (US)

(73) Assignees: NEC CORPORATION, Tokyo (JP); THE UNIVERSITY OF WASHINGTON, Seattle, WA (US)

( * ) Notice: Subject to any disclaimer, the term of this patent is extended or adjusted under 35 U.S.C. 154(b) by 143 days.

(21) Appl. No.: 14/130,335

(22) PCT Filed: Mar. 1, 2012

(86) PCT No.: PCT/US2012/027233
§ 371 (c)(1),
(2), (4) Date: Mar. 19, 2014

(87) PCT Pub. No.: WO2013/006215
PCT Pub. Date: Jan. 10, 2013

(65) Prior Publication Data
US 2014/0195238 A1    Jul. 10, 2014

Related U.S. Application Data

(60) Provisional application No. 61/503,956, filed on Jul. 1, 2011.

(51) Int. Cl.
*G10L 15/06* (2013.01)
*G10L 15/02* (2006.01)
*G10L 15/10* (2006.01)

(52) U.S. Cl.
CPC .............. *G10L 15/02* (2013.01); *G10L 15/063* (2013.01); *G10L 15/10* (2013.01)

(58) Field of Classification Search
CPC ....... G10L 15/22; G10L 15/063; G10L 15/08; G10L 15/26; G10L 15/187; G10L 15/065; G10L 15/14; G10L 2015/0636; G10L 15/144; G10L 25/78; G10L 15/142; G10L 15/1815; G10L 2015/088; G06F 17/275; G06F 17/274
USPC ........ 704/250–257, 236–242, 9–10, 231–232
See application file for complete search history.

(56) References Cited

U.S. PATENT DOCUMENTS 7,890,325 B2    2/2011    Liu et al.
2002/0173955 A1*  11/2002  Reich ............................ 704/231
(Continued)

FOREIGN PATENT DOCUMENTS

JP    2003308094 A    10/2003
JP    2009-116075 A    5/2009
(Continued)

OTHER PUBLICATIONS

Frank Wessel et al., "Confidence Measures for Large Vocabulary Continuous Speech Recognition", IEEE Transactions on Speech and Audio Processing, Mar. 2001, pp. 288-298, vol. 9, No. 3.
(Continued)

*Primary Examiner* — Marivelisse Santiago Cordero
*Assistant Examiner* — Stephen M Brinich
(74) *Attorney, Agent, or Firm* — Sughrue Mion, PLLC

(57) ABSTRACT

An apparatus that calculates a confidence measure of a target word string specified in a recognition result includes: an alternative candidate generator which generates an alternative candidate word string in the position of the target word string; a classifier training unit which trains a classifier which is configured to discriminate between the target word string and the alternative candidate word string; a feature extractor which extracts a feature value representing an adjacent context in the position of the target word string; and a confidence measure calculator which determining whether the true word string in the position of the target word string is the target word string or the alternative candidate word string by using the classifier and the feature value and calculates a confidence measure of the target word string on the basis of the determination result.

34 Claims, 5 Drawing Sheets

(56) References Cited

U.S. PATENT DOCUMENTS

| | | | |
|---|---|---|---|
| 2004/0064316 A1* | 4/2004 | Gallino | 704/251 |
| 2005/0114131 A1 | 5/2005 | Stoimenov et al. | |
| 2005/0149328 A1* | 7/2005 | Huang et al. | 704/252 |
| 2014/0188460 A1* | 7/2014 | Ouyang et al. | 704/9 |

FOREIGN PATENT DOCUMENTS

| | | | |
|---|---|---|---|
| KR | 10-2006-0098673 A | | 9/2006 |
| WO | WO 2015021844 A1 * | | 2/2015 |

OTHER PUBLICATIONS

Lidia Mangu et al., "Finding consensus in speech recognition: word error minimization and other applications of confusion networks", Computer Speech and Language, 2000, pp. 373-400, vol. 14, No. 4.

Stephen Cox et al., "High-Level Approaches to Confidence Estimation in Speech Recognition", IEEE Transactions on Speech and Audio Processing, Oct. 2002, pp. 460-471, vol. 10, No. 7.

International Search Report for PCT/US2012/027233 dated Sep. 26, 2012.

Communication dated Mar. 22, 2016, from the Japanese Patent Office in counterpart application No. 2014-518551.

* cited by examiner some got in the *parks* and now he's done he's *protected* those park for no one absolutely nobody is allowed to go inside the park *boundaries* now the "guerrillas" ← TARGET WORD are coming back seventeen percent *tourism* is up as I said like I figure national park is incredible some got in the parks and now he's done he's protected those park for no one absolutely nobody is allowed to go inside the park boundaries now <u>the</u> <u>guerrillas</u>
<u>are coming</u> back seventeen percent tourism is up as I said like I figure national park is incredible

| WORD | PHONETIC SYMBOL STRING |
|---|---|
| ... | ... |
| gorillas | g ao r ih l ax s |
| ... | ... |
| guerrillas | g eh r ih l ax s |
| guess | g eh s |
| guessed | g eh s t |
| guest | g eh s t |
| guests | g eh s t s |
| ... | ... |

|  | ACTUALLY SPOKEN WORD | | | | | | |
|---|---|---|---|---|---|---|---|
| RECOGNITION RESULT | ... | apple | ... | gorillas | ... | guerrillas | ... |
| | ... | ... | ... | ... | ... | ... | ... |
| | gorillas | ... | 0.0 | ... | 0.5 | ... | 0.3 | ... |
| | ... | ... | ... | ... | ... | ... | ... |
| | guerrillas | ... | 0.0 | ... | 0.2 | ... | 0.4 | ... |
| | ... | ... | ... | ... | ... | ... | ... |

FIG. 9    150

... after hiking <u>for more than an hour the park rangers find a nest where a family of</u>
*gorillas*
<u>spent the night nearby they discover food them bamboo chutes nearby they
discover food recently</u> eaten by ...

FIG. 10    160

RELATIVE SEMANTIC CONFIDENCE MEASURE FOR ERROR DETECTION IN ASR

CROSS REFERENCE TO RELATED APPLICATIONS

This application is a National Stage of International Application No. PCT/US2012/027233 filed Mar. 1, 2012, claiming priority based on U.S. Provisional Application No. 61/503,956 filed Jul. 1, 2011, the contents of all of which are incorporated herein by reference in their entirety.

This application claims the benefit of U.S. Provisional Application No. 61/503,956 filed on Jul. 1, 2011, which is herein incorporated by reference.

BACKGROUND OF THE INVENTION

1. Field of the Invention

The present invention relates to calculation of confidence measure which represents a degree of correctness of a target word or a target word string, and more particularly to a method and apparatus of the confidence measure calculation based on a degree of matching between the target word string that undergoes confidence measure calculation and an adjacent context in a recognition result.

2. Description of the Related Art

Recently, automatic speech recognition (ASR) systems are widely used to, for example, directly input text data and commands to computer systems by speech. However, even the most advanced speech recognition system cannot produce a speech recognition result containing no recognition error. It is therefore important to calculate a confidence measure of a recognition result so as to automatically detect a recognition error. The confidence measure, which represents the degree of correctness of a recognition result, is so calculated that the greater the confidence measure is, the higher the probability of the recognition result being correct is, whereas the smaller the confidence measure is, the higher the probability of the recognition result being wrong is. For example, in spoken document retrieval, which is one of applications based on speech recognition results, the accuracy of the retrieval is improved by either eliminating recognition results having a confidence measure smaller than or equal to a certain value from a retrieval index list, or by weighting the count of words used in retrieval according to their confidence.

An example of calculation method of the confidence measure of a word in a speech recognition result is proposed in S. Cox and S. Dasmahapatra, "High-level approaches to confidence estimation in speech recognition," *IEEE Trans. Speech and Audio Processing*, vol. 10, no. 7, pp. 460-471, 2002, which is herein incorporated by reference. The method proposed by Cox et al. is based on an idea that a correctly recognized word has large semantic relatedness with each adjacent word whereas a wrongly recognized word has small semantic relatedness with each adjacent word.

The method proposed by Cox et al. will be described with reference to FIG. 1 illustrating a configuration of a confidential measure calculation apparatus in a related art which implements the method of Cox et al. A speech of a user is supplied to speech input unit 301 and the supplied speech is then sent to speech recognition system 302 such as the ASR system. The recognition result, i.e., recognized text, is supplied to confidence measure calculation target specifier 303 and adjacent word extractor 304. Text data for training is stored in training text data storage 311.

In the apparatus shown in FIG. 1, the training text data stored in training text data storage 311 is used to calculate in advance semantic relatedness between any two arbitrary words in a manner described below. The calculation of semantic relatedness is performed by semantic relatedness calculator 306 and the result of the calculation is stored in semantic relatedness storage 312. When a speech recognition result is provided from speech recognition system 302, confidence measure calculation target specifier 303 specifies a target word for the confidence measure calculation from the recognition result, and adjacent word extractor 304 then extracts words adjacent to the target word from the recognition result. Finally, confidence measure calculator 305 refers to values stored in semantic relatedness storage 312 to calculate semantic relatedness between the target word and each of the extracted adjacent words and averages the resultant semantic relatedness values. The average is used as the confidence measure of the target word and stored in calculation result storage 313.

The method of Cox et al. uses latent semantic analysis (LSA) to calculate semantic relatedness between any two arbitrary words by using training text data. LSA is a method for determining a degree of co-occurrence between any two arbitrary words in training data. A large degree of co-occurrence between two words means that the two words are likely used at the same time in the training data. Since two words that are often used at the same time are considered to be semantically related to each other to a large extent, a degree of co-occurrence between two words calculated by using LSA is considered to be semantic relatedness between the two words.

A specific method for calculating semantic relatedness based on LSA is as follows: Training data is first divided into a plurality of documents. When the training data is, for example, taken from newspapers, one newspaper article may be used as one document. A term-document matrix whose elements represent weights of the words in the document is then created. A frequently used weight of a word is a term frequency (TF) and a term frequency-inverse document frequency (TF-IDF). Each row vector in a term-document matrix represents a distribution showing how often a corresponding word appears in each document. Singular value decomposition (SVD) is then so performed on the term-document matrix that each word is expressed as a lower-dimension row vector. Since a similar structure between row vectors is maintained in SVD, calculating the degree of cosine similarity between resultant row vectors provides semantic relatedness between the corresponding two words.

As described above, when the semantic relatedness between a target word and each adjacent word is small, it is believed that the target word is likely wrong. In the method for calculating a confidence measure proposed by Cox et al., when the semantic relatedness between a target word and each adjacent word is small, the confidence measure of the target word is also small, whereby a recognition error can be detected based on the calculated confidence measure.

The technology described above, however, is problematic in that even when a target word of confidence measure calculation is a recognition error, a large confidence measure may be obtained in some cases. In that case, the confidence measure of the target word is highly likely to be larger than a predetermined threshold and the target word will be wrongly judged as correct.

The reason for the problem described above is that even when a target word is a recognition error, the semantic relatedness between the target word and an adjacent word may be large in some cases. FIG. 2 shows an example of such a case. FIG. 2 specifically shows a speech recognition result of spoken English news. Assume now that "guerrillas" is selected as a target word for confidence measure calculation from speech recognition result 320, and that "guerrillas" is a recognition error and "gorillas" is correct. It is therefore expected that the semantic relatedness between "guerrillas" and each adjacent word is small. When the semantic relatedness between "guerrillas" and each adjacent word in the recognition result was actually calculated using LSA with a English training text data, "guerrillas" had large semantic relatedness, for example, with "parks," "protected," "boundaries," and "tourism" (i.e., thick italic words in FIG. 2). The reason for "guerrillas" having a large semantic relatedness with "tourism" is because there are in fact articles in the training data about former guerrillas working to rebuild their communities through tourism. As a result, although "guerrillas" was a recognition error, the confidence measure calculated by using the method of Cox et al, increased as opposed to initial intention. In general, since every single word often relates to many other words, the method proposed by Cox et al. does not always lower the relatedness between a target word and an adjacent word when the target word is a recognition error.

SUMMARY OF THE INVENTION

An object of the present invention is to provide a confidence measure calculation method that can output a small confidence measure even when the semantic relatedness between a confidence measure calculation target word or word string and an adjacent word is large but when the target word or the target word string is a recognition error.

Another object of the present invention is to provide a confidence measure calculation apparatus that outputs a small confidence measure even when the semantic relatedness between a confidence measure calculation target word or word string and an adjacent word is large but when the target word or the target word string is a recognition error.

More generally, an object of the present invention is to provide a confidence measure calculation technique that can provide a small confidence measure even when the degree of matching between a confidence measure calculation target word or word string and an adjacent context is large but when the target word or the target word string is a recognition error. In the present Specification, term "word string" means a word concatenation including one or more words, and only one word is also called a word string.

According to an exemplary aspect of the present invention, a method of calculating a confidence measure of a target word string specified in a recognition result includes: receiving the recognition result and the target word string; generating an alternative candidate word string in a position of the target word string; training a classifier which is configured to discriminate between the target word string and the alternative candidate word string; extracting a feature value representing an adjacent context in the position of the target word string; determining whether the true word string in the position of the target word string is the target word string or the alternative candidate word string by using the classifier and the feature value; and calculating a confidence measure of the target word string on the basis of the determination result.

According to another exemplary aspect of the present invention, a confidence measure calculation apparatus that calculates a confidence measure of a target word string specified in a recognition result includes: a generator generating an alternative candidate word string in a position of the target word string; a training unit training a classifier which is configured to discriminate between the target word string and the alternative candidate word string; an extractor extracting a feature value representing an adjacent context in the position of the target word string; and a calculator determining whether the true word string in the position of the target word string is the target word string or the alternative candidate word string by using the classifier and the feature value, and calculating a confidence measure of the target word string on the basis of the determination result.

According to a further exemplary aspect of the present invention, a confidence measure calculation apparatus that calculates a confidence measure of a target word string specified in a recognition result includes: means for generating an alternative candidate word string in a position of the target word string; means for training a classifier which is configure to discriminate between the target word string and the alternative candidate word string; means for extracting a feature value representing an adjacent context in the position of the target word string; and means for determining whether the true word string in the position of the target word string is the target word string or the alternative candidate word string by using the classifier and the feature value to calculate a confidence measure of the target word string on the basis of the determination result.

These and other embodiments and advantages of the present invention will become apparent from the following detailed description, taken in conjunction with the accompanying drawings, illustrating by way of example the principles of the invention.

BRIEF DESCRIPTION OF THE DRAWINGS

FIG. 9 is a diagram showing a specific example of an inter-word confusion matrix in the Example;

FIG. 10 is a view illustrating an example of an instance collected by classifier training unit from training data in the Example.

DESCRIPTION OF EMBODIMENTS

Figures 1, 2:
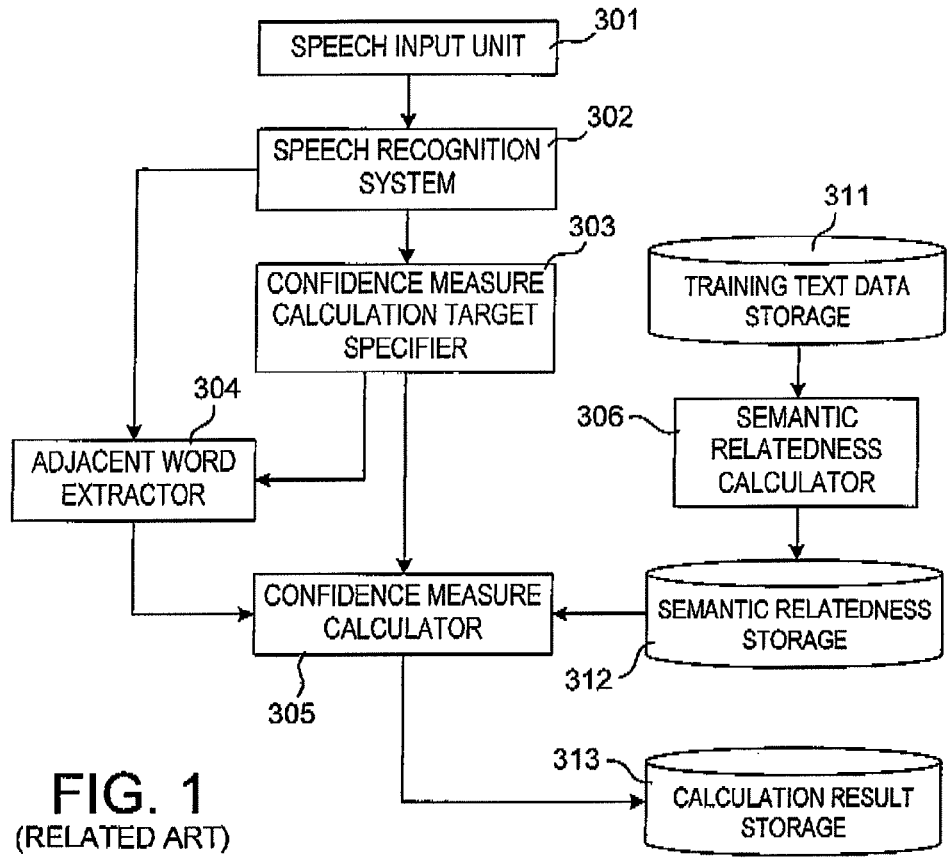
FIG. 1 is a block diagram showing an example of configuration of confidence measure calculation apparatus in a related art which calculates a confidence measure of a target word in a recognition result.
FIG. 2 is a view showing an example of a speech recognition result.
Figure 3:
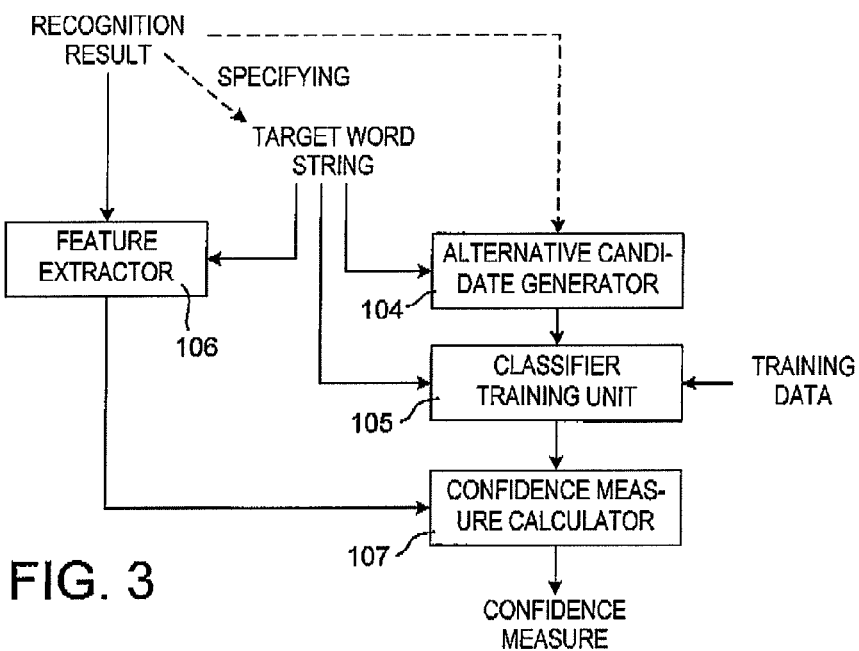
FIG. 3 is a block diagram showing configuration of a confidence measure calculation apparatus according to an exemplary embodiment of the present invention.

FIG. 3 illustrates a fundamental configuration of the confidence measure calculation apparatus according to an exemplary embodiment. The apparatus shown in FIG. 3 is configured to calculate a confidence measure of a target word string specified in a recognition result. The recognition result may be one obtained from, for example, a speech recognition system. The confidence measure calculation apparatus includes: alternative candidate generator 104; classifier training unit 105; feature extractor 106, and confidence measure calculator 107.

In the apparatus, alternative candidate generator 104 receives the target word string for confidence measure calculation and generates an alternative candidate word string that is a conceivable recognition result in the position of a target word string. Alternative candidate generator 104 may also receive the recognition result. The alternative candidate word string generated at this point is a word concatenation including at least one word and may be only one word. In this process, a word string that is most likely correct is generated as the alternative candidate word string. Alternative candidate generator 104 may generate an alternative candidate word string only by using information provided from the target word string or by using various pieces of information obtained from the speech recognition system.

Classifier training unit 105 receives the target word string, and the corresponding alternative candidate word string supplied from alternative candidate generator 104. Classifier training unit 105 then uses training data stored in an external storage to train a classifier that discriminates between the target word string and the other candidate word string.

Feature extractor 106 receives information on the recognition result and extracts a feature value representing an adjacent context in the position of the target word string.

Confidence measure calculator 107 uses the classifier supplied from classifier training unit 105 and the feature value supplied from feature extractor 106 to solve a classification problem of whether a true word in the position of the target word string is the target word string or the alternative candidate word string. Confidence measure calculator 107 then outputs a larger confidence measure when the classification result shows a greater possibility of the true word being the target word string.

Figure 4:
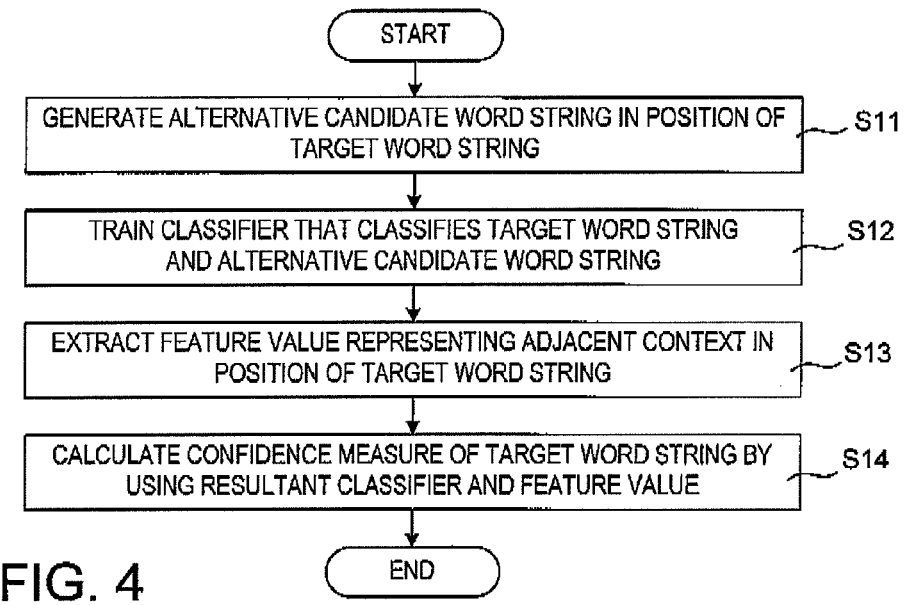
FIG. 4 is a flowchart showing the operation of the apparatus shown in FIG. 3.

The operation of the apparatus shown in FIG. 3 will next be described with reference to FIG. 4.

When a target word string for confidence measure calculation is specified from a recognition result, alternative candidate generator 104 first generates an alternative candidate word string that is a conceivable recognition result in the position of the target word string, at box S11. Then, at box S12, classifier training unit 105 trains the classifier that discriminates between the target word string and the alternative candidate word string supplied from alternative candidate generator 104. At box S13, feature extractor 106 then uses information on the recognition result to extract a feature value representing an adjacent context in the position of the target word string. At box S14, confidence measure calculator 107 finally uses the classifier supplied from classifier training unit 105 and the feature value supplied from feature extractor 106 to solve a classification problem and outputs a larger confidence measure when the classification result shows a greater possibility of the true word string being the target word string. The classification problem is a problem of whether the true word siring in the position of the target word string is the target word string or the alternative candidate word string.

Since the process in step S13 uses only the information on the recognition result and the target word string, step S13 may be carried out any time before step S14 is carried out.

If there are multiple utterances to be recognized, step S11 may be first carried out for all of the utterances, and multiple positions of targets may be obtained. After that, the training step S12 may be carried out for all of the positions. Finally, step S13 and S14 may be carried out for all of the positions and confidence measures of the targets may be calculated all together.

As described above, in the present exemplary embodiment, confidence measure calculation apparatus 100 solves the classification problem and outputs a larger confidence measure as a calculation result when the classification result shows a greater possibility of the true word string being the target word string (i.e., when the target word string is highly likely to be correct in the context of extracted features in the position of the target word string, a large confidence measure is obtained). The resultant confidence measure is therefore an index representing how more the target word string matches an adjacent context in the position of the target word string than the alternative candidate word string.

Since alternative candidate generator 104 outputs a word string that is most likely correct as the alternative candidate word string, the alternative candidate word string is likely correct when the target word string is a recognition error. It is further expected that the degree of matching between a correct word string and the adjacent context is higher than the degree of matching between a recognition error and the adjacent context. It is therefore expected that even when the degree of matching between the target word string and the adjacent context is large but when the target word string is a recognition error, the degree of matching between the alternative candidate word string and the adjacent context is larger. As a result, confidence measure calculator 107 outputs a smaller confidence measure because the classification result shows a smaller possibility of the true word string being the target word string, whereby the detection of a recognition error is facilitated.

Further, in the present embodiment, since classifier training unit 105 trains a classifier dedicated to discriminate between a target word string and an alternative candidate word string, confidence measure calculator 107 can perform classification with high accuracy, whereby the accuracy of the resultant confidence measure is improved.

Example

Figures 5, 6:
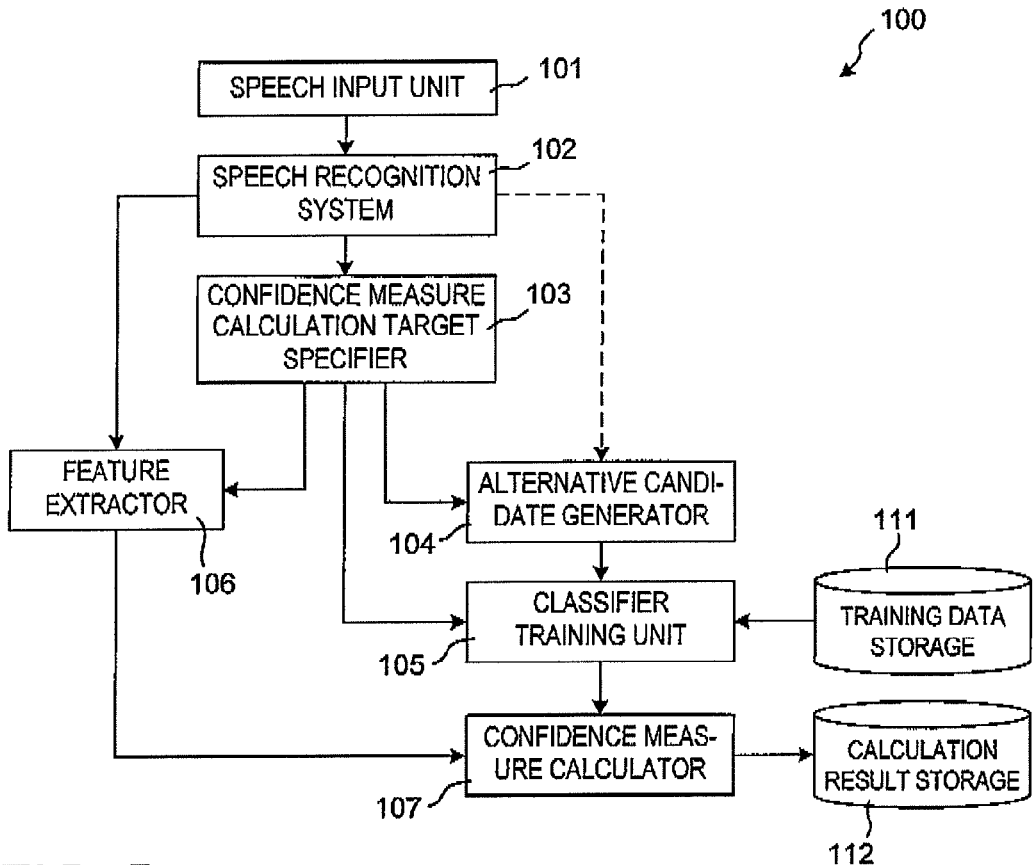
FIG. 5 is a block diagram showing configuration of an apparatus according to Example.
FIG. 6 is a view illustrating a specific example of a recognition result supplied from a speech recognition system in the Example.

The confidence measure calculation apparatus according to the present embodiment will next be more specifically described with reference to an Example. FIG. 5 illustrates the apparatus according to the Example.

As with the case shown in FIG. 3, confidence measure calculation apparatus 100 in the Example generally includes: alternative candidate generator 104; classifier training unit 105; feature extractor 106; and confidence measure calculator 107. In the Example, confidence measure calculation apparatus 100 further includes: speech input unit 101, speech recognition system 102, confidence measure calculation target specifier 103, training data storage 111, and calculation result storage 112.

Speech input unit 101 receives speech data to be processed and outputs the speech data to speech recognition system 102. Examples of the speech data may include conference speech data, broadcasting speech data, lecture speech data, telephone speech data, speech data distributed over the Internet, conversation speech data produced when a car navigation system, a robot, or any other system is used, and a variety of other speech data. Any of the speech data described above may be recorded in advance or provided from a microphone, a video camcorder, or any other apparatus in real time.

Speech recognition system 102 receives speech data from speech input unit 101 and converts the speech data into word strings by using known speech recognition technology. For example, speech data can be converted into word strings by using an acoustic model and a language model along with frame-synchronous beam search. An example of the acoustic model is Hidden Markov Model using mel-frequency cepstral coefficients (MFCCs) as feature values, and an example of the language model is word trigrams. FIG. 6 shows an example of a recognition result, which is obtained by recognizing English news speech. In general, a speech recognition result contains a recognition error. In speech recognition result 120 shown in FIG. 6, for example, the word spoken as "gorillas" was wrongly recognized as "guerillas" at the third line in the example. A recognition result is also called a hypothesis.

Speech recognition system 102 can typically output a plurality of hypotheses as recognition results. Examples of known techniques for outputting a plurality of hypotheses as recognition results may include an N-best list, a word lattice, and a confusion network. The N-best list allows a plurality of sentence hypotheses to be outputted in descending order of score down to an N-th one. The word lattice allows a plurality of hypotheses to be expressed by using a graph structure. The confusion network is a compact representation of the N-best list or the word lattice.

Figures 7, 8:
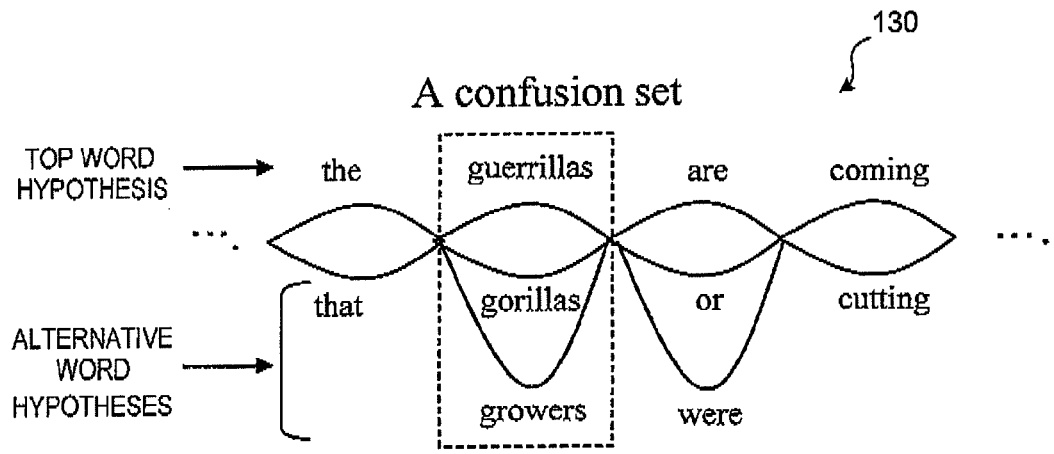
FIG. 7 is a view illustrating a specific example of a recognition result expressed in a confusion network format which is supplied from the speech recognition system in the Example.
FIG. 8 is a diagram showing a specific example of a pronunciation dictionary in the Example.

FIG. 7 shows an example of the confusion network corresponding to the position of the underlined portion (i.e., "the guerillas are coming") in recognition result 120 shown in FIG. 6. Confusion network 130 consists of a series of confusion sets, each of which includes a plurality of word hypotheses, the top word hypothesis and alternative word hypotheses. As seen from FIG. 7, for example, the top word hypothesis in the second confusion set from the left is "guerillas," and alternative word hypotheses in the second confusion set are "gorillas" and "growers." A method for creating a confusion network is described in, for example, L. Mangu, E. Brill and A. Stolcke, "Finding consensus in speech recognition: word error minimization and other applications of confusion networks," *Computer Speech and Language, vol. 14*, no. 4, pp. 373-400, 2000, which is herein incorporated by reference.

Confidence measure calculation target specifier 103 specifies a target word or word string, which is to be subjected to the confidence measure calculation, from a recognition result supplied from speech recognition system 102. Which word is specified may be determined as appropriate in accordance with what is the purpose of the resultant confidence measure. All words contained in the recognition result may be sequentially specified, or only nouns contained in the recognition result may be specified. Further, a word to be specified is not limited to a top word hypothesis. For example, "gorillas," which is the second word hypothesis in confusion network 130 shown in FIG. 7, may be specified as a target word of the confidence measure calculation. Alternatively, a word concatenation including two or more words may be specified as the target of the confidence measure calculation. For example, a two-word concatenation of "guerillas are" shown in FIG. 7 may be specified as a target word string. In the present Specification, a target word string represents a word concatenation including one or more words, and only one word is also called a target word string. It is assumed in the following description that "guerillas" in confusion network 130 shown in FIG. 7 is specified as a target word string of confidence measure calculation.

When confidence measure calculation target specifier 103 specifies a target word string, confidence measure calculation apparatus 100 according to the Example outputs a confidence measure representing the degree of correctness of the target word string, based on the recognition result supplied from speech recognition system 102 and the specified target word string.

Alternative candidate generator 104 first reads the target word string specified by confidence measure calculation target specifier 103 and generates an alternative candidate word string that is a conceivable recognition result in the position of the target word string. This process corresponds to box S11 in FIG. 4. In this process, alternative candidate generator 104 outputs a word string that is most likely correct as the alternative candidate word string.

A word hypothesis other than the target word string outputted in the position of the target word string by a recognition system can be used as a word that is most likely correct. For example, when "guerillas" is a target word string in FIG. 7, "gorillas" and "growers," which are alternative word hypotheses in the position of "guerillas", can be alternative candidate words. Since these alternative word hypotheses are words having been judged by the recognition system to be likely correct, either of them is likely correct when the top word hypothesis is wrong. Alternative candidate generator 104 may output, as an alternative candidate word, one word having the highest score among the alternative word hypotheses in the confusion network. Alternative candidate generator 104 may also output, as an alternative candidate word, a plurality of words among the alternative word hypotheses. The alternative candidate may be a word concatenation including two or more words. Specifically, the alternative candidate may be a word concatenation that temporally overlaps with the target word string. For example, when "guerillas are" is a target word, "guerillas or," "guerillas were," "gorillas are," and "growers or," etc. may be generated as the alternative candidate word strings.

As another method used by alternative candidate generator 104 for outputting an alternative candidate word string that is most likely correct, a word the pronunciation of which is similar to that of a target word can be generated as an alternative candidate word by referring to a pronunciation dictionary. Since the recognition system tends to confuse a word with another when they are similarly pronounced, it is believed that a word the pronunciation of which is similar to that of a target word is likely correct.

A pronunciation dictionary is a data table in which words and phonetic symbol strings thereof are listed. FIG. 8 shows an example of the pronunciation dictionary. A phonetic symbol string is often expressed by a phoneme string or a syllable string. Phonetic similarity between any two arbitrary words can be calculated by using known DP matching method to determine the distance between the corresponding two phonetic symbol strings. For example, referring to pronunciation dictionary 140 shown in FIG. 8, one can see that a word having a phonetic symbol string most similar to that of "guerillas" is "gorillas," which has one different phonetic symbol. The "gorillas" may therefore be outputted as an alternative candidate word. In this method, alternative candidate generator 104 does not require a recognition result such as a confusion network. Furthermore, by creating in advance a list of pairs of a target word and an alternative word so that they have similar pronunciations, alternative candidate generator 104 can generate an alternative word by only referring to the list.

As still another method used by alternative candidate generator 104 for outputting an alternative candidate word that is most likely correct, a word that the recognition system tends to confuse with a target word can be generated as an alternative candidate word by referring to an inter-word confusion matrix. A word that the recognition system tends to confuse with a target word is believed to be a word that is likely correct.

The inter-word confusion matrix shows probabilities of each word corresponding to each column being actually spoken given each word corresponding to each row is recognized by the recognition system. FIG. 9 shows an example of the inter-word confusion matrix. In inter-word confusion matrix 150 shown in FIG. 9, when "guerillas" is a recognition result, the probability of an actually spoken word being "apple" is 0.0; the probability of an actually spoken word being "gorillas" is 0.2; the probability of an actually spoken word being "guerillas" is 0.4; and so on. When "guerillas" is a target word, alternative candidate generator 104 refer to the inter-word confusion matrix and output "gorillas," which is likely an actually spoken word, as an alternative candidate word. An inter-word confusion matrix can be automatically created in advance by recognizing speech data by a recognition system and aligning obtained results with correct transcripts of the speech data.

Classifier training unit 105 then receives the target word string and the alternative candidate word string supplied from alternative candidate generator 104 and uses training data stored in training data storage 111 to train a classifier that discriminates the target word string and the alternative candidate word string. This process corresponds to box S12 shown in FIG. 4.

Classifier training unit 105 first collects an instance of the target word string and an instance of the alternative candidate word string from the training data stored in training data storage 111. FIG. 10 shows an example of an instance of an alternative candidate word "gorillas." The instance is obtained by searching a position where "gorillas" appears in training text data 160. Training data storage 111 may store articles taken from newspapers and other text data. When "guerillas" is a target word string and "gorillas" is an alternative candidate word string, the position where "guerillas" appears in the training text data may be an instance of the target word string, and the position where "gorillas" appears in the training text data may be an instance of the alternative candidate word string.

Feature values for the target word string are then extracted from the collected instances of the target word string. Similarly, feature values for the alternative candidate word string are extracted from the collected instances of the alternative candidate word string. Those feature values are formed based on a group of words present in the vicinity of the target word string and the candidate word string in the training data. For example, the feature values may be a vector having elements representing frequencies of words appearing within a certain distance from the position of the target word string or the candidate word string in the training data. In the instance shown in FIG. 10, for example, the feature value may be a vector having elements representing frequencies of each word appearing within a 15-word distance from "gorillas" (i.e., underlined words). In the example, possible features are "'nest' appears once," "'food' appears twice," and so on. In this process, auxiliary verbs, articles, prepositions, and so on, that are commonly regarded as stop words, may be removed from the vector. Alternatively, instead of frequencies of words, frequencies of attributes of the words such as part-of-speech, appearing near the target word or the candidate word may be the feature values. Still alternatively, frequencies of a two-word concatenation, such as "park rangers," or a three-word concatenation, such as "a family of," appearing near the target word string or the candidate word string may be the feature value. Instead of the frequency of appearance, the feature value may be expressed by binary values ("0" and "1," for example) representing whether or not a word of interest appears. As a still alternatively conceivable feature value, the position where a certain word appears, for example, "whether or not 'family' is present two words ahead," may be considered.

Finally, classifier training unit 105 uses the thus collected feature values of the target word string and the collected feature values of the alternative candidate word string to train a two-class classifier that discriminates between the target word string and the alternative candidate word string. Examples of the classifier may include logistic regression, a neural network, and a support vector machine (SVM), which are known classifiers.

In two-class logistic regression, a posterior probability $P(y|x; w)$ is defined by Eq. (1). In Eq. (1), x represents a feature vector representing an instance, $y \in \{+1, -1\}$ represents an output class, and w represents a model parameter. The output class may, for example, be +1 for an instance of a target word string and −1 for an instance of an alternative candidate word string.

$$P(y \mid x; w) = \frac{1}{1 + \exp(-y \cdot w^T \cdot x)}. \tag{1}$$

The parameter w is determined on the basis of a criterion defined by Eq. (2).

$$w^* = \underset{w}{\operatorname{argmin}} \sum_{i=1}^{n} \log(1 + \exp(-y \cdot w^T \cdot x)) + C\|w\|_1, \tag{2}$$

where $$\|w\|_1 = \sum_{j=1}^{m} w_j.$$

In Eq. (2), n represents the total number of instances collected from training data, $w_j$ is a parameter corresponding to a j-th element of the feature vector, m represents the number of dimensions of the feature vector, and C represents a normalization factor. The last term in the right-hand side of Eq. (2) is a normalization term for avoiding over-fitting.

As shown in Eq. (1), a model obtained by logistic regression can output a classification result as a probability. That is, when the resultant model is used to classify a new instance, the probability of the instance being the target word string and the probability of the instance being the alternative candidate word string can be determined.

The two-class classifier may not necessarily be configured on the basis of the logistic regression but may alternatively be configured on the basis of other known technologies. For example, a neural network or support vector machine may be exploited.

Feature extractor 106 then receives the recognition result supplied from speech recognition system 102 and extracts a feature value representing an adjacent context in the position of the target word string of the confidence measure calculation. This process corresponds to box S13 shown in FIG. 4. Feature extractor 106 extracts the same type of feature value as that used by classifier training unit 105 to train a classifier. For example, when the feature value that classifier training unit 105 extracts from the training data to train a classifier is "frequencies of words appearing within a certain distance from a word string," the feature value that feature extractor 106 extracts from the recognition result is "frequencies of words appearing within a certain distance from a target word string for the confidence measure calculation." In this case, when recognition result 120 shown in FIG. 6 is supplied and the target word string is "guerillas," the feature value extracted by feature extractor 106 is frequencies of words appearing near "guerillas". For example, the features are "'tourism' appears once," "'park' appears three times," and so on.

Since feature extractor 106 only receives the recognition result and information on what the target word string is, feature extractor 106 can be operated before alternative candidate generator 104 and classifier training unit 105 are operated. What is important is that the type of the feature value that feature extractor 106 extracts from the recognition result is the same as the type of the feature value that classifier training unit 105 extracts from the training data to train a classifier.

Finally, confidence measure calculator 107 uses the classifier received from classifier training unit 105 and the feature value received from feature extractor 106 to calculate and output a confidence measure of the target word string. This process corresponds to box S14 shown in FIG. 4. The resultant confidence measure may be stored in calculation result storage 112.

The feature value from feature extractor 106 is first applied to the classifier trained by classifier training unit 105, and the classifier discriminates the target word string and the alternative candidate word string. In other words, the classifier determines whether the actually spoken word string (i.e., a true word string) is the target word string specified from the recognition result or the alternative candidate word string generated by alternative candidate generator 104.

When the result of the classification shows that the true word string is the target word string, a predetermined value ("1," for example) is outputted as the confidence measure of the target word string, whereas when the result of the classification shows that the true word string is the alternative candidate word string, another predetermined value ("0," for example) smaller than the other is outputted as the confidence measure. Alternatively, when the probability of the true word string being the target word string can be determined (i.e., when the probability that the target word string is correct can be obtained), for example, by using logistic regression as the classifier, the resultant probability may be outputted as the confidence measure of the target word string.

Confidence measure calculation apparatus 100 according to the Example, by carrying out the processes described above, receives a recognition result from speech recognition system 102 and a target word string from confidence measure calculation target specifier 103, and outputs a confidence measure of a target word string.

When alternative candidate generator 104 outputs a plurality of alternative candidate word strings, classifier training unit 105 may use the positions where any of the alternative candidate word strings appear in the training text data as instances of all the alternative candidate word strings. For example, when alternative candidate generator 104 outputs two alternative candidate word strings, "gorillas" and "growers," classifier training unit 105 may collect all the positions where "gorillas" and "growers" appear in the training text data as instances of the alternative candidate word strings.

As another processing method employed when alternative candidate generator 104 outputs a plurality of alternative candidate word strings, classifier training unit 105 may assume that the plurality of alternative candidate word strings belong to different classes and train a multiclass classifier that discriminates between the target word string and any of the alternative candidate word strings. For example, when the target word string of the confidence measure calculation is "guerillas," and alternative candidate generator 104 outputs "gorillas" and "growers" as alternative candidate word strings, classifier training unit 105 may train a three-class classifier that discriminates between "guerillas," "gorillas," and "growers."

A multiclass classifier can be provided by training two-class classifiers on all pairs of classes. Multiclass classification is performed by using all two-class classifiers to performed respective classification and using decision by majority to judge the most frequently classified class to be the classification result. For example, when three-class classification is performed on "guerillas," "gorillas" and "growers", three two-class classifiers, "guerillas" versus "gorillas," "guerillas" versus "growers," and "gorillas" versus "growers," are trained. To perform the classification, all the three two-class classifiers are used, and the most frequently classified class is outputted. For example, when the result of the classification performed by the three classifiers is "gorillas, guerillas, gorillas," the classification result of the three-class problem is "gorillas."

When classifier training unit 105 trains a multiclass classifier, confidence measure calculator 107 performs multiclass classification by using the resultant classifier to find what the true word string in the position of the target word string is. When the classification result shows that the true word string is the target word string, a predetermined value ("1," for example) is outputted as the confidence measure of the target word string, whereas when the classification result shows that the true word string is any of the alternative candidate word strings, another predetermined value ("0," for example) smaller than the other is outputted as the confidence measure.

The reason why a confidence measure determined in the Example properly represents the degree of correctness of a target word string is as follows:

First, when confidence measure calculator 107 provides a classification result showing that "a true word string in the position of a target word string is the target word string," or "the true word string is likely the target word string," the classification result means that the target word string ("guerillas" in the example in FIG. 7) matches an adjacent context in the position of the target better than the alternative candidate word string ("gorillas" in the example in FIG. 7). This means that the target word string is believed to have a higher degree of correctness than the alternative candidate word string. The confidence measure determined in the Example becomes large in this case.

On the other hand, when confidence measure calculator 107 provides a classification result showing that "the true word string in the position of the target word string is the alternative candidate word string," or "the true word string is unlikely the target word string," the classification result means that the alternative candidate word string ("gorillas") matches an adjacent context in the position of the target better than the target word string ("guerillas"). This means that the alternative candidate word string is believed to have a higher degree of correctness than the target word string. The confidence measure determined in the Example becomes small in this case.

In the Example, since classifier training unit 105 trains a classifier dedicated to discriminate between a target word string and an alternative candidate word string, confidence measure calculator 107 can accurately determine whether the true word string in the position of the target word string is the target word string or the alternative candidate word string. As a result, the accuracy of the resultant confidence measure is improved.

Further, in the Example, even when the degree of matching between a target word string of the confidence measure calculation and an adjacent context is large, but when the target word string is a recognition error, a small confidence measure can be obtained. The reason for this is as follows:

Since alternative candidate generator 104 outputs a word string that is most likely correct as an alternative candidate word string, the alternative candidate word string is likely correct when the target word string is a recognition error. It is further expected that the degree of matching between a correct word string and the adjacent context is higher than the degree of matching between a recognition error and the adjacent context. Therefore, even when the degree of matching between the target word string and the adjacent context is large, but when the target word string is a recognition error, it is expected that the degree of matching between the alternative candidate word string and the adjacent context is larger. As a result, confidence measure calculator 107 provides a classification result showing that "the true word string in the position of the target word string is the alternative candidate word string," or "the true word string is unlikely the target word string," and a small confidence measure is obtained.

The confidence measure of a target word string determined by using the method described in the Example can be used to judge whether or not the target word string is a recognition error. Specifically, when the confidence measure is smaller than or equal to a predetermined threshold, the target word string may be judged to be a recognition error.

Further, combining the confidence measure of a target word string determined by using the method described in the Example with a word posterior probability given by the recognition system to each word string in a recognition result allows a recognition error to be judged in a more accurate manner. Specifically, for example, when the posterior probability of a target word string is smaller than or equal to a predetermined threshold, and the confidence measure of the target word string determined by using the method described in the Example is smaller than or equal to another predetermined threshold, the target word may be judged to be a recognition error. The posterior probability of a target word string can be calculated, for example, by using the known technology described in F. Wessel, R. Schluter, K. Macherey, and H. Ney, "Confidence measures for large vocabulary continuous speech recognition," *IEEE Trans. Speech and Audio Processing*, vol. 9, no. 3, pp. 288-298, 2001, which is herein incorporated by reference.

Further, a confidence measure determined by using the method described in the Example can be used to correct a target word string to an alternative word string that is believed to be more correct. Specifically, the confidence measure of a target word string and the confidence measure of an alternative candidate word string in the position of the target word string are first calculated by using the method described in the Example. The target word string is then corrected to a word string having the largest confidence measure. For example, in the example in FIG. 7, when the target word is "guerillas," not only is the confidence measure of "guerillas" calculated, but also alternative candidate words "gorillas" and "growers" are considered as target words and the confidence measures thereof are similarly calculated. When "gorillas" of the three words has the largest confidence measure, "guerillas" is corrected to "gorillas."

According to the method of the Example, even when the degree of matching between a confidence measure calculation target word string and an adjacent context is large, but when the target word string is a recognition error, a small confidence measure can be outputted. Further, a confidence measure determined by using the method of the Example can be used to detect a recognition error with accuracy.

Next, an alternative implementation of the present invention will be described.

Figure 11:
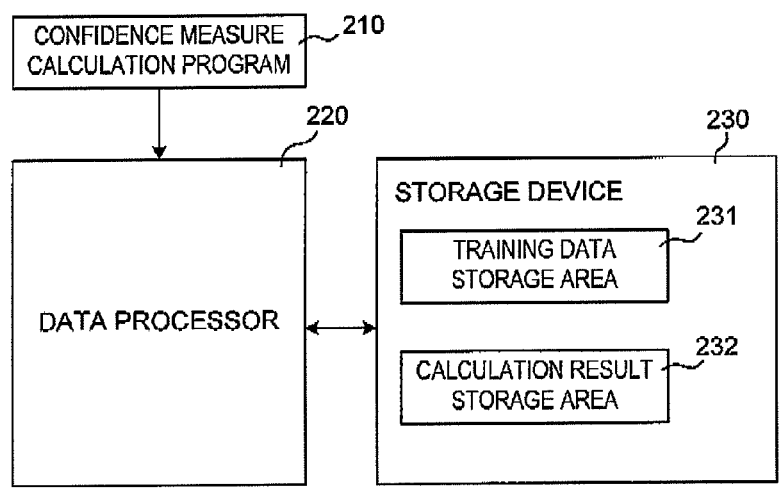
FIG. 11 is a block diagram showing a configuration of an apparatus in which another exemplary embodiment of the present invention is implemented.

In the apparatus shown in FIG. 3, each of alternative candidate generator 104, classifier training unit 105, feature extractor 106 and confidence measure calculator 107 may be configured as a dedicated hardware component. Similarly, in the apparatus shown in FIG. 5, each of speech input unit 101, speech recognition system 102, confidence measure calculation target specifier 103, alternative candidate generator 104, classifier training unit 105, feature extractor 106, confidence measure calculator 107, training data storage 111 and calculation result storage 112 is configured as a dedicated hardware component. However, the implementation of the present invention is not limited to these configurations. FIG. 11 illustrates an apparatus for an alternative implementation of the present invention.

The apparatus shown in FIG. 11 generally consists of a computer system which implements the confidence measure calculation method described above. The computer system includes a data processor 220 including a CPU and other components; a storage device 230 including a magnetic disk, a semiconductor memory, or any other component. Confidence measure calculation program 210 including software codes to perform the processes of the confidence measure calculation method is provided to data processor 220. Program 230 is carried on, foe example, a non-transitory computer-readable recording medium such as a magnetic tape, CD-ROM, and flash memory.

In storage device 230, training data storage area 231 and confidence measure calculation result storage area 232 are allocated. Both areas 231 and 232 are memory areas for storing specific data and respectively correspond to training data storage 111 and calculation result storage 112 of the apparatus shown in FIG. 5.

Confidence measure calculation program 210, which is read by data processor 220 and controls the operation thereof, allows data processor 220 to achieve the function of the apparatus shown in FIG. 5. In other words, data processor 220 carries out the processes of alternative candidate generator 104, classifier training unit 105, feature extractor 106, and confidence measure calculator 107 shown in FIG. 5 under the control of confidence measure calculation program 210.

The present invention is applicable to, for example, a spoken document retrieving and browsing system, an automatic speech translation system, and a variety of other speech recognition systems, and possible to improve the accuracy and usability of the system. The present invention is also applicable to unsupervised acoustic model adaptation and unsupervised language model adaptation for improving the accuracy of a recognition system by using a recognition result weighted by a confidence measure calculated by the apparatus and the method according to the present invention.

The present invention has been described with reference to the exemplary embodiments and examples, but the present invention is not limited to the exemplary embodiments and examples described above. Various modifications to be understood by a person skilled in the art can be made to the construction and the detail of the present invention within the scope of the present invention.

What is claimed is:

1. A computer-implemented confidence measure calculation method of calculating a confidence measure of a target word string specified in a recognition result, the method comprising:
 a processor receiving the recognition result and the target word string;
 generating, with the processor, an alternative candidate word string in a position of the target word string;
 obtaining training data from a training data storage;
 training, with the processor, a classifier which is configured to discriminate between the target word string and the alternative candidate word string, using the training data;
 extracting a feature value representing an adjacent context in the position of the target word string;
 determining, with the processor, whether a true word string in the position of the target word string is the target word string or the alternative candidate word string by using the classifier and the feature value; and
 calculating, with the processor, a confidence measure of the target word string on the basis of the determination result and storing the confidence measure in a calculation result storage.

2. The method according to claim 1, wherein a plurality of the alternative candidate word strings are generated, the classifier is configured to discriminate between the target word string and any of the plurality of alternative candidate word strings, and whether the true word string in the position of the target word string is the target word string or any of the plurality of alternative candidate word strings is determined by using the classifier.

3. The method according to claim 1, wherein the classifier is configured to output a posterior probability of classification result, and the posterior probability that the target word string is correct is used as the confidence measure of the target word string.

4. The method according to claim 1, wherein, when the true word string in the position of the target word string is classified as the target word string, a first constant is used as the confidence measure of the target word string, whereas, when the true word string in the position of the target word string is classified as the alternative candidate word string, a second constant smaller than the first constant is used as the confidence measure of the target word string.

5. The method according to claim 1, wherein a hypothesis which is outputted by a recognition system in the position of the target word string and is other than the target word string is used as the alternative candidate word string.

6. The method according to claim 1, wherein a word string having pronunciation which is similar to pronunciation of the target word string is generated as the alternative candidate word string by referring to a pronunciation dictionary.

7. The apparatus according to claim 1, wherein a word string that a recognition system tends to confuse with the target word string is generated as the alternative candidate word string by referring to an inter-word confusion matrix.

8. The apparatus according to claim 1, wherein the feature value representing the adjacent context in the position of the target word string is calculated on the basis of frequencies of words appearing within a certain distance from the position of the target word string or frequencies of attributes of the words.

9. The method according to claim 1, further comprising:
 judging the target word string to be a recognition error when the calculated confidence measure of the target word string is smaller than or equal to a predetermined threshold.

10. The method according to claim 1, further comprising:
 judging the target word string to be a recognition error when a posterior probability of the target word string outputted from a recognition system is smaller than or equal to a first threshold and the calculated confidence measure of the target word string is smaller than or equal to a second threshold.

11. The method according to claim 1, further comprising:
 carrying out the generating, the training, the extracting and the determining to obtain a confidence measure of the target word string and a confidence measure of the alternative candidate word string; and
 outputs a word string having a largest confidence measure.

12. A confidence measure calculation apparatus that calculates a confidence measure of a target word string specified in a recognition result, the apparatus comprising:
 a generator generating an alternative candidate word string in a position of the target word string;
 a training unit training a classifier which is configured to discriminate between the target word string and the alternative candidate word string;
 an extractor extracting a feature value representing an adjacent context in the position of the target word string; and
 a calculator determining whether a true word string in the position of the target word string is the target word string or the alternative candidate word string by using the classifier and the feature value, and calculating a confidence measure of the target word string on the basis of the determination result.

13. The apparatus according to claim 12, wherein the generator generates a plurality of the alternative candidate word strings, the classifier is configured to discriminate between the target word string and any of the plurality of alternative candidate word strings, and, upon determination the calculator determines whether the true word string in the position of the target word string is the target word string or any of the plurality of alternative candidate word strings.

14. The apparatus according to claim 12, wherein the classifier is configured to output a posterior probability of classification result, and the calculator uses the posterior probability that the target word string is correct as the confidence measure of the target word string.

15. The apparatus according to claim 12, wherein the calculator uses a first constant as the confidence measure of the target word string when the true word string in the position of the target word string is classified as the target word string, whereas the calculator uses a second constant smaller than the first constant as the confidence measure of the target word string when the true word string in the position of the target word string is classified as the alternative candidate word string.

16. The apparatus according to claim 12, wherein the generator uses, as the alternative candidate word string, a hypothesis which is outputted by a recognition system in the position of the target word string and is other than the target word string.

17. The apparatus according to claim 12, wherein the generator refers to a pronunciation dictionary and generates, as the alternative candidate word string, a word string having pronunciation of which is similar to pronunciation of the target word string.

18. The apparatus according to claim 12, wherein the generator refers to an inter-word confusion matrix to generate, as the alternative candidate word string, a word string that a recognition system tends to confuse with the target word string.

19. The apparatus according to claim 12, wherein the feature value representing the adjacent context in the position of the target word string is calculated on the basis of frequencies of words appearing within a certain distance from the position of the target word string or frequencies of attributes of the words.

20. The apparatus according to claim 12, wherein, when the calculated confidence measure of the target word string is smaller than or equal to a predetermined threshold, the target word string is judged to be a recognition error.

21. The apparatus according to claim 12, wherein, when a posterior probability of the target word string outputted from a recognition system is smaller than or equal to a first threshold and the calculated confidence measure of the target word string is smaller than or equal to a second threshold, the target word string is judged to be a recognition error.

22. The apparatus according to claim 12, wherein the apparatus calculates a confidence measure of the target word string and a confidence measure of the alternative candidate word string, and outputs a word string having a largest confidence measure.

23. A confidence measure calculation apparatus that calculates a confidence measure of a target word string specified in a recognition result, the apparatus comprising:
   means for generating an alternative candidate word string in a position of the target word string;
   means for training a classifier which is configured to discriminate between the target word string and the alternative candidate word string;
   means for extracting a feature value representing an adjacent context in the position of the target word string; and
   means for determining whether a true word string in the position of the target word string is the target word string or the alternative candidate word string by using the classifier and the feature value to calculate a confidence measure of the target word string on the basis of the determination result.

24. A non-transitory computer-readable recoding medium that stores a program which causes a computer to execute the processes of:
   receiving a recognition result and a target word string which is specified in the recognition result;
   generating an alternative candidate word string in a position of the target word string;
   training a classifier which is configured to discriminate between the target word string and the alternative candidate word string;
   extracting a feature value representing an adjacent context in the position of the target word string;
   determining whether a true word string in the position of the target word string is the target word string or the alternative candidate word string by using the classifier and the feature value; and
   calculating a confidence measure of the target word string on the basis of the determination result.

25. The recording medium according to claim 24, wherein the program causes the computer to generate a plurality of the alternative candidate word strings in the generating process, to train a classifier which is configured to discriminate between the target word string and any of the plurality of alternative candidate word strings in the training process, and determine whether the true word string in the position of the target word string is the target word string or any of the plurality of alternative candidate word strings by using the classifier in the determination process.

26. The recording medium according to claim 24, wherein the classifier is configured to output a posterior probability of classification result, and the program causes the computer to use the posterior probability that the target word string is correct as the confidence measure of the target word string in the calculation process.

27. The recording medium according to claim 24, wherein the program causes the computer, in the calculation process, to use a first constant as the confidence measure of the target word string when the true word string in the position of the target word string is classified as the target word string, whereas use a second constant smaller than the first constant as the confidence measure of the target word string when the true word string in the position of the target word string is classified as the alternative candidate word string.

28. The recording medium according to claim 24, wherein the program causes the computer to use, as the alternative candidate word string, a hypothesis being outputted by a recognition system in the position of the target word string and being other than the target word string.

29. The recording medium according to claim 24, wherein the program causes the computer to refer to a pronunciation dictionary and generate a word string having pronunciation which is similar to pronunciation of the target word string as the alternative candidate word string, in the generating process.

30. The recording medium according to claim 24, wherein the program causes the computer to refer to an inter-word confusion matrix and generate a word string that a recognition system tends to confuse with the target word string as the alternative candidate word string, in the generating process.

31. The recording medium according to claim 24, wherein the program causes the computer to calculate the feature value representing the adjacent context in the position of the target word string on the basis of frequencies of words appearing within a certain distance from the position of the target word string or frequencies of attributes of the words.

32. The recording medium according to claim 24, wherein the program further causes the computer to execute the process of judging the target word string to be a recognition error when the calculated confidence measure of the target word string is smaller than or equal to a predetermined threshold.

33. The recording medium according to claim 24, wherein the program further causes the computer to execute the process of judging the target word string to be a recognition error when a posterior probability of the target word string outputted from a recognition system is smaller than or equal to a first threshold and the calculated confidence measure of the target word string is smaller than or equal to a second threshold.

34. The recording medium according to claim 24, wherein the program further causes the computer to execute the processes of:
   executing the processes of the generating, the training, the extracting and the classifying determining to obtain a confidence measure of the target word string and a confidence measure of the alternative candidate word string, and
   outputting a word string having a largest confidence measure.

* * * * *